(No Model.) 4 Sheets—Sheet 1.

G. L. JAEGER.
MACHINE FOR MAKING PARTITIONS FOR BOXES.

No. 303,935. Patented Aug. 19, 1884.

WITNESSES:
Chas. Wahlers.
William Miller

INVENTOR
Gustav L. Jaeger
BY Van Santvoord & Hauff,
ATTORNEYS

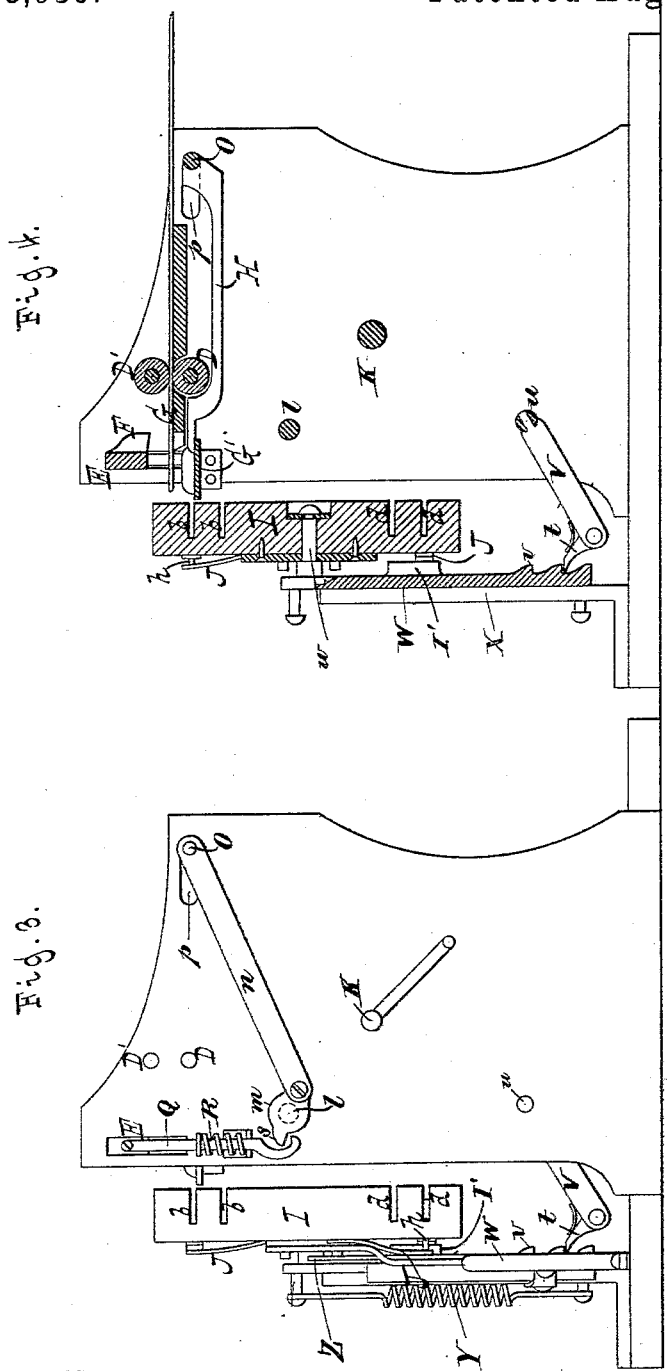

(No Model.) 4 Sheets—Sheet 3.
G. L. JAEGER.
MACHINE FOR MAKING PARTITIONS FOR BOXES.
No. 303,935. Patented Aug. 19, 1884.
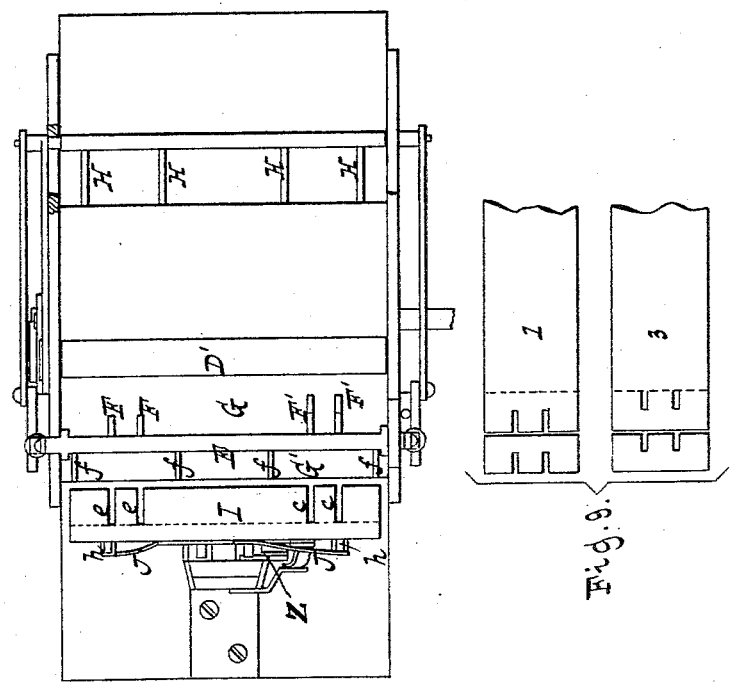
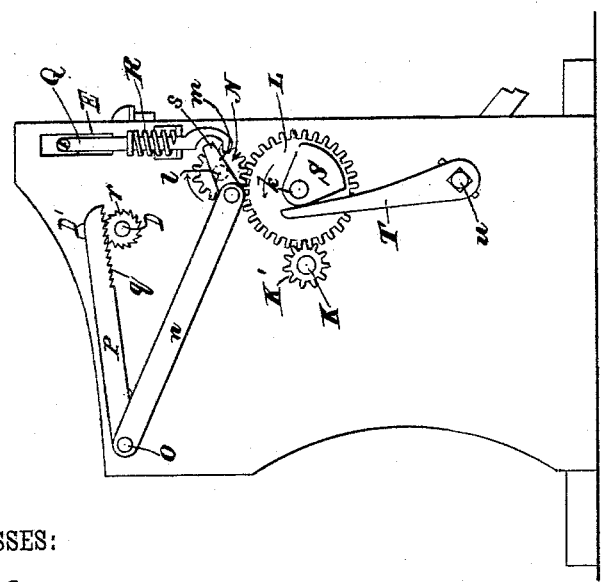
WITNESSES:
Chas. Wahlers.
William Miller
INVENTOR
Gustav L. Jaeger
BY Van Santvoord & Hauff
ATTORNEYS (No Model.) 4 Sheets—Sheet 4.
G. L. JAEGER.
MACHINE FOR MAKING PARTITIONS FOR BOXES.

No. 303,935. Patented Aug. 19, 1884.

WITNESSES:
Chas. Wahlers.
William Miller

INVENTOR
Gustav L. Jaeger
BY Van Santvoord & Hauff
ATTORNEYS

I continues to fall after the pin referred to strikes the end of the arm Z, and since this arm does not yield, the pin causes the frame I to revolve on its axis, while it moves to a lower position. In the lower position of the frame I the spring-actuated arm Z assumes the position shown in Fig. 7.

Figure 1:
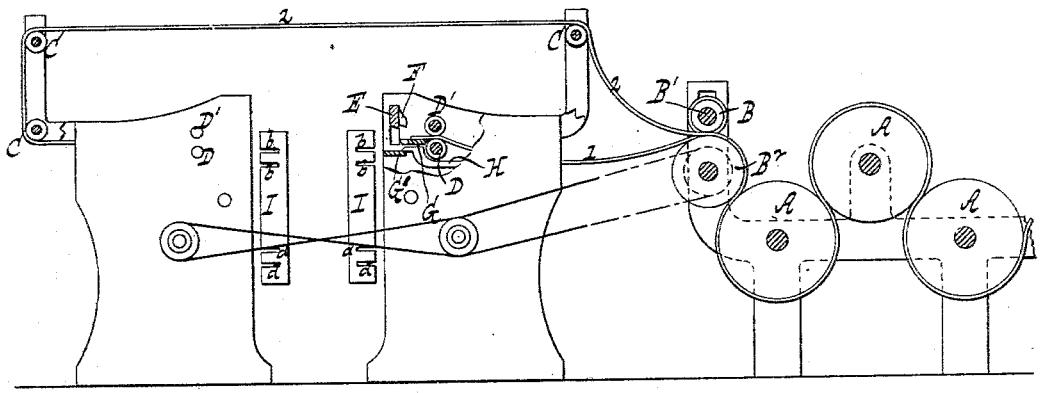
Figure 2:
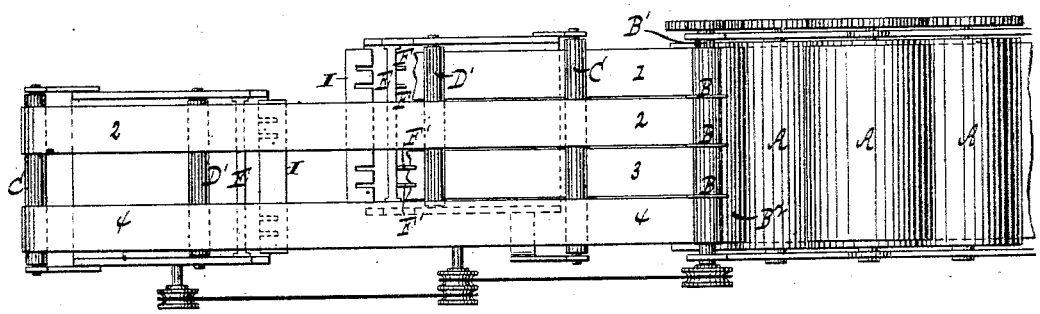
Figure 6:
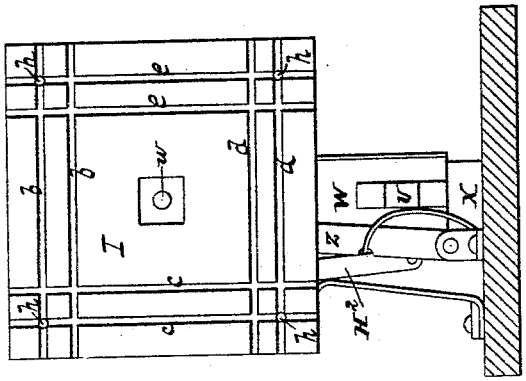
Figure 7:
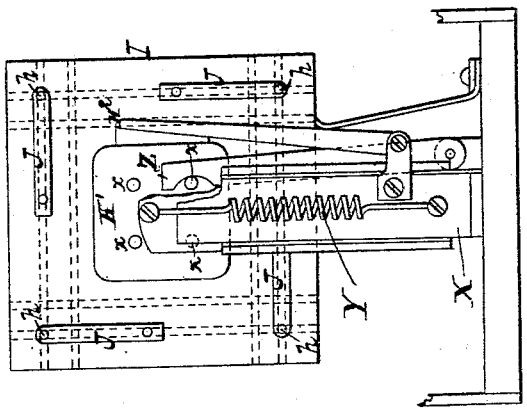

For the purpose of checking the frame I in the required positions as it revolves, I make use of a polygonal plate, H', and a detent, H², engaging such plate, as shown in Fig. 7.

To the standard X is secured a projection or cam, I', against which the ejectors J strike successively as they reach a lower position, and by this means the ejectors are forced inward, so that their pins $h$ project into the grooves $b\ c\ d\ e$, thereby freeing the same of partitions.

The egg-tray machine herein described is of the class shown and described in Letters Patent of the United States granted to me September 23, 1879, No. 219,949, the feeding, cutting, slotting, and interlocking mechanism being precisely those of the patent mentioned; but it should be understood that I do not confine myself to the use of any particular machine or any number of machines.

What I claim as new, and desire to secure by Letters Patent, is—

1. The combination, substantially as hereinbefore set forth, of the delivery-cylinders for feeding the straw-board, mechanism, substantially as described, for cutting such board into strips suitable for box-partitions, two cutting and slotting mechanisms, substantially as described, for forming the interlocking slots, and two feeding mechanisms arranged to feed the strips to the two slotting mechanisms.

2. The combination, substantially as hereinbefore set forth, with the delivery-cylinder of a straw-board machine, of a mechanism, substantially such as described, arranged to act on the material passing off from said cylinder for cutting the material into partitions, slotting the partitions, and finally interlocking the partitions by means of their slots.

3. The combination, substantially as hereinbefore set forth, of the rotary cutters, the cutting-dies, and the slotting-dies, whereby a web of straw-board may be divided longitudinally into strips, which are then cut into partitions having slots for interlocking them.

4. The combination, substantially as hereinbefore set forth, of the rotary cutters, the cutting-dies, the slotting-dies, and the intermittingly-acting feed devices, for the purpose specified.

5. The combination, substantially as hereinbefore set forth, of the rotary cutters, the cutting-dies, the slotting-dies, the intermittingly-acting feed devices, the intermittingly-revolving frames having intersecting grooves, and pushers for inserting the partitions into such grooves.

In testimony whereof I have hereunto set my hand and seal in the presence of two subscribing witnesses.

GUSTAV L. JAEGER. [L. S.]

Witnesses:
W. HAUFF,
E. F. KASTENHUBER.

I continues to fall after the pin referred to strikes the end of the arm Z, and since this arm does not yield, the pin causes the frame I to revolve on its axis, while it moves to a lower position. In the lower position of the frame I the spring-actuated arm Z assumes the position shown in Fig. 7.

For the purpose of checking the frame I in the required positions as it revolves, I make use of a polygonal plate, H', and a detent, H², engaging such plate, as shown in Fig. 7.

To the standard X is secured a projection or cam, I', against which the ejectors J strike successively as they reach a lower position, and by this means the ejectors are forced inward, so that their pins $h$ project into the grooves $b\ c\ d\ e$, thereby freeing the same of partitions.

The egg-tray machine herein described is of the class shown and described in Letters Patent of the United States granted to me September 23, 1879, No. 219,949, the feeding, cutting, slotting, and interlocking mechanism being precisely those of the patent mentioned; but it should be understood that I do not confine myself to the use of any particular machine or any number of machines.

What I claim as new, and desire to secure by Letters Patent, is—

1. The combination, substantially as hereinbefore set forth, of the delivery-cylinders for feeding the straw-board, mechanism, substantially as described, for cutting such board into strips suitable for box-partitions, two cutting and slotting mechanisms, substantially as described, for forming the interlocking slots, and two feeding mechanisms arranged to feed the strips to the two slotting mechanisms.

2. The combination, substantially as hereinbefore set forth, with the delivery-cylinder of a straw-board machine, of a mechanism, substantially such as described, arranged to act on the material passing off from said cylinder for cutting the material into partitions, slotting the partions, and finally interlocking the partitions by means of their slots.

3. The combination, substantially as hereinbefore set forth, of the rotary cutters, the cutting-dies, and the slotting-dies, whereby a web of straw-board may be divided longitudinally into strips, which are then cut into partitions having slots for interlocking them.

4. The combination, substantially as hereinbefore set forth, of the rotary cutters, the cutting-dies, the slotting-dies, and the intermittingly-acting feed devices, for the purpose specified.

5. The combination, substantially as hereinbefore set forth, of the rotary cutters, the cutting-dies, the slotting-dies, the intermittingly-acting feed devices, the intermittingly-revolving frames having intersecting grooves, and pushers for inserting the partitions into such grooves.

In testimony whereof I have hereunto set my hand and seal in the presence of two subscribing witnesses.

GUSTAV L. JAEGER. [L. S.]

Witnesses:
   W. HAUFF,
   E. F. KASTENHUBER.